June 17, 1969
C. T. FLACHBARTH
3,451,033
COUPLING FOR UNDERFLOOR DUCTS
Filed Aug. 17, 1967
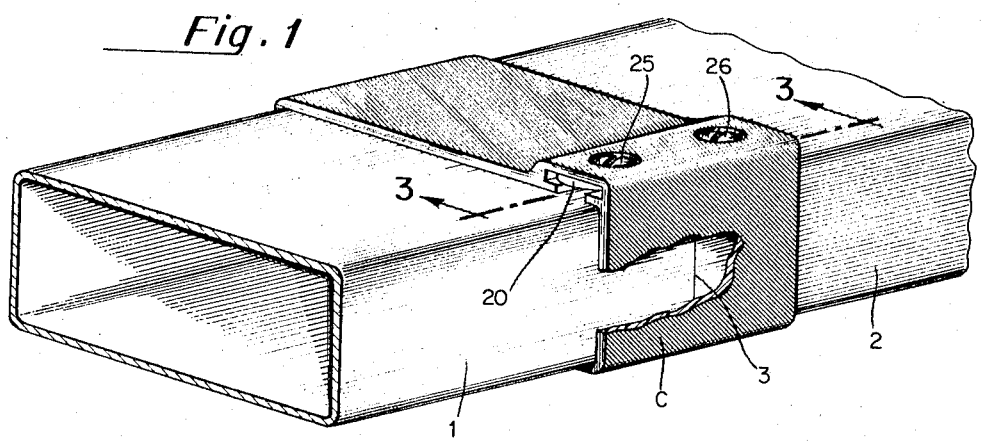
Fig. 1
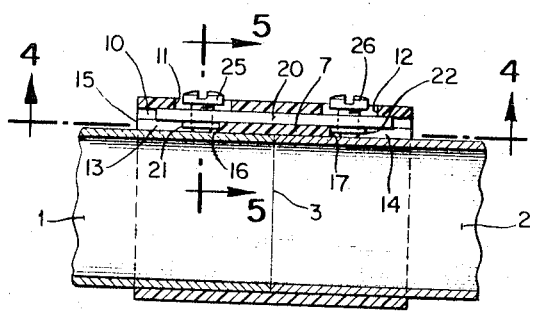
Fig. 2
Fig. 3
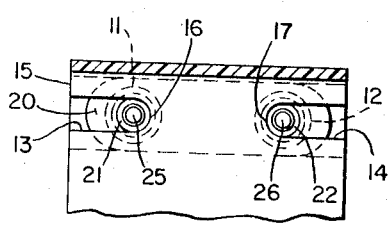
Fig. 4
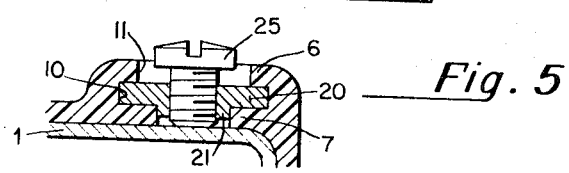
Fig. 5 ent Office 3,451,033
Patented June 17, 1969

3,451,033
COUPLING FOR UNDERFLOOR DUCTS
Charles T. Flachbarth, Parkersburg, W. Va., assignor to Textron, Inc., Providence, R.I., a corporation of Rhode Island
Filed Aug. 17, 1967, Ser. No. 661,278
Int. Cl. H01r 3/06; H05k 5/02; H02g 15/08
U.S. Cl. 339—14                    2 Claims

ABSTRACT OF THE DISCLOSURE

Coupling made of plastic for joining the ends of two underfloor ducts and having means providing a grounding connection between the ducts.

---

This invention relates to underfloor distribution systems and in particular relates to improvements in couplings for joining two underfloor ducts.

More specifically, the invention contemplates a plastic coupling for joining two metal ducts, the coupling uniting the ducts mechanically and in addition providing an electrical or grounding connection between the ducts.

One of the primary objectives of the invention is to provide a mechanically and electrically reliable, low-cost, corrosion resistant coupling for underfloor ducts.

One conventional way of making metal couplings contemplates forming a rectangular-shaped tube, cutting the same into sections, deburring, degreasing, painting and then drilling and tapping holes for the locking and grounding screws. A great deal of manufacturing labor is involved in these operations.

The present invention eliminates these costly manufacturing steps by providing a plastic coupling which is molded to shape in a one-shot operation and after molding a metal grounding strip is pushed into a slot provided in the coupling where it is automatically locked in place.

Depending upon materials, the cost of a plastic coupling made in accordance with the invention is less than the cost of fabricating a metal coupling by the method mentioned above. Not only is the coupling of the invention conducive to savings in manufacturing costs but in addition it effectively reduces or minimizes corrosion problems.

The invention may be described below in connection with the following drawings wherein:

FIGURE 1 is a perspective view of a pair of underfloor ducts joined together by a coupling constructed in accordance with the invention;

FIGURE 2 is an exploded view of a coupling of FIGURE 1;

FIGURE 3 is a sectional elevational view taken along the lines 3—3 of FIGURE 1;

FIGURE 4 is a view taken along the lines 4—4 of FIGURE 3; and

FIGURE 5 is a fragmentary view taken along the lines 5—5 of FIGURE 4.

In FIGURE 1 the ends of the floor ducts 1 and 2 are abutted together as at 3. Surrounding the joint 3 and mechanically and electrically connecting the ducts is a coupling C.

The coupling comprises a hollow rectangular shaped body 4 with a grounding section 5 comprising a pair of spaced apart outer and inner walls 6 and 7. The space between the walls forms a slot 10. The outer wall has a pair of spaced-apart apertures 11 and 12 which are in communication with the slot 10. The inner wall 7 is formed with a pair of open notches 13 and 14.

The notch 13 extends from the left-hand edge 15 inwardly along the axis of the body and terminates in the semi-circular area indicated at 16. The inner part or semi-circular area 16 forms an opening which is in alignment with the aperture 11 so that a grounding screw can extend through the aperture 11, slot 10 and the notch 13. The notch 14 is similarly constructed and oriented, having an inner terminal area 17.

The metal grounding strip 20 is elongated and is provided with a pair of bosses 21 and 22 together with a pair of threaded apertures 23 and 24. The threads extend through the bosses 21 and 22. As will be apparent from an inspection of FIGURE 3 the bosses extend downwardly from the bottom surface of the strip and project into the terminal openings 16 and 17 of the notches 13 and 14. By contacting terminal areas 16 and 17 the bosses prevent the strip from moving axially out of the slot 10. The width of the slot 10 is slightly greater than the width of the strip.

With the parts in the position shown in FIGURE 3 the grounding screws 25 and 26 are threaded into the apertures 23 and 24 and extend through the notches 13 and 14 to respectively engage the ducts 1 and 2. The grounding screws are turned down tightly so that the ducts bear firmly against the inner walls of the coupling. This secures the ducts in position and provides an electrical ground connection.

With respect to manufacturing, the body 4 including the grounding section 5 with its slot 10, apertures 11 and 12 and notches 13 and 14 is formed as by molding. The body is removed from the mold and while it is not yet completely polymerized the grounding strip 20 is inserted into the slot (from either end) and pushed forward until the bosses are respectively disposed at the ends of the notches. The assembly is then allowed to fully cure and the grounding strip is locked in place. The grounding screws 25 and 26 are then put into place and the coupling is ready for use.

In lieu of the notches 13 and 14, it is contemplated that openings (such as the terminal openings 16 and 17) be formed in the inner wall 7. With this construction the grounding strip (similarly as described above) is placed in the slot with the bosses secure in the openings just after the molding operation.

The plastic material for the body is preferably polyvinyl chloride or an equivalent creep-resistant, flame-extinguishing plastic.

The grounding strip 20 is a conventional structure commonly used in domestic and industrial devices and is fabricated by common shop techniques.

I claim:

1. A plastic coupling for mechanically and electrically joining two metal underfloor ducts comprising:
    a hollow, rectangular elongated plastic-shaped body for receiving the respective ends of two underfloor ducts to be coupled;
    a grounding strip holding section on said body formed as by a pair of spaced apart outer and inner walls, the space between the walls forming a slot extending along the axis of the body;
    a pair of spaced apart apertures in said outer wall in communication with said slot;
    said inner wall being formed with a pair of open notches respectively extending from an edge of the body along the body axis and terminating so that the inner part of the notch is in alignment with an aperture;
    a metal grounding strip in said slot, the strip having means forming a pair of threaded apertures and including a pair of threaded bosses, the bosses being respectively in engagement with the terminal parts of the notches, the engagement securing the strip against axial movement out of the slot; and a pair of grounding screws respectively extending through said outer wall apertures and threaded in the threads of said bosses and being adapted to extend through the respective notches for engaging and holding a duct.

2. A plastic coupling for mechanically and electrically joining two metal underfloor ducts comprising:

a hollow, rectangular shaped, elongated plastic body for receiving the respective ends of two metal underfloor ducts;

a grounding strip holding section on said body formed as by a pair of spaced apart inner and outer walls, the space between the walls forming a slot extending along the axis of the body;

a pair of apertures in said outer wall in communication with said slot;

means on said inner wall forming a pair of openings communicating the slot with the interior of the body and the openings being respectively in alignment with said apertures;

a metal grounding strip in said slot the strip having means forming a pair of threaded apertures and including a pair of threaded bosses and the bosses being respectively in engagement with the means forming said openings, the engagement securing the strip against axial movement out of the slot; and a pair of grounding screws respectively extending through said outer wall apertures and threaded in the threads of said bosses and being adapted to extend through the respective openings for engaging and holding a duct.

References Cited

UNITED STATES PATENTS

| | | | |
|---|---|---|---|
| 2,937,227 | 5/1960 | Selnau | 174—51 XR |
| 3,213,187 | 10/1965 | Kish | 174—84 |
| 3,260,790 | 7/1966 | Alsup | 174—51 |

FOREIGN PATENTS 708,243  4/1965  Canada.

MARVIN A. CHAMPION, *Primary Examiner.*

PATRICK A. CLIFFORD, *Assistant Examiner.*

U.S. Cl. X.R.

174—51, 84